(No Model.) 2 Sheets—Sheet 1.
J. B. KELSEY, J. WALLACE & J. B. THOMPSON
ROTARY WHEELED HARROW.
No. 510,143. Patented Dec. 5, 1893.
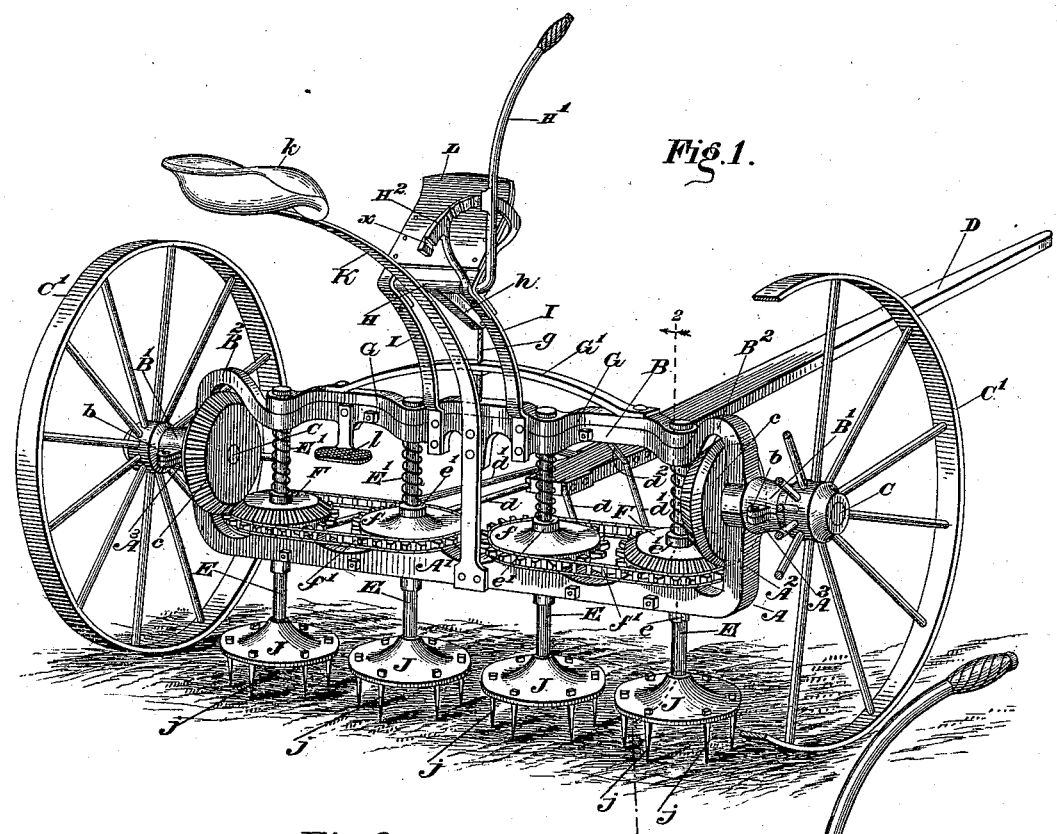
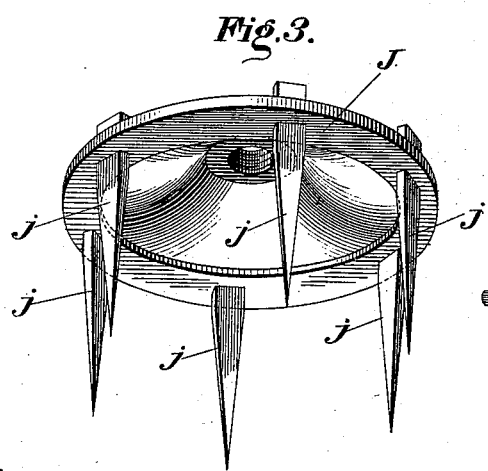
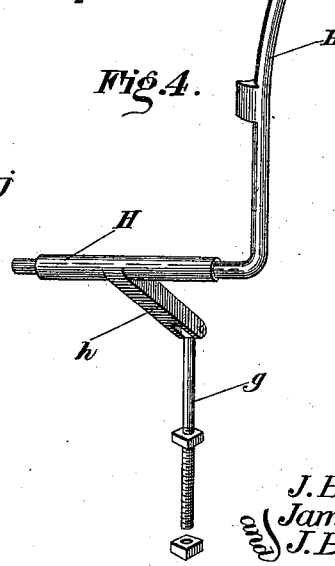
Witnesses:
M. E. Fowler
James R. Mansfield
Inventors:
J. B. Kelsey
James Wallace
J. B. Thompson
By their Attorneys: Alexander & Dowell

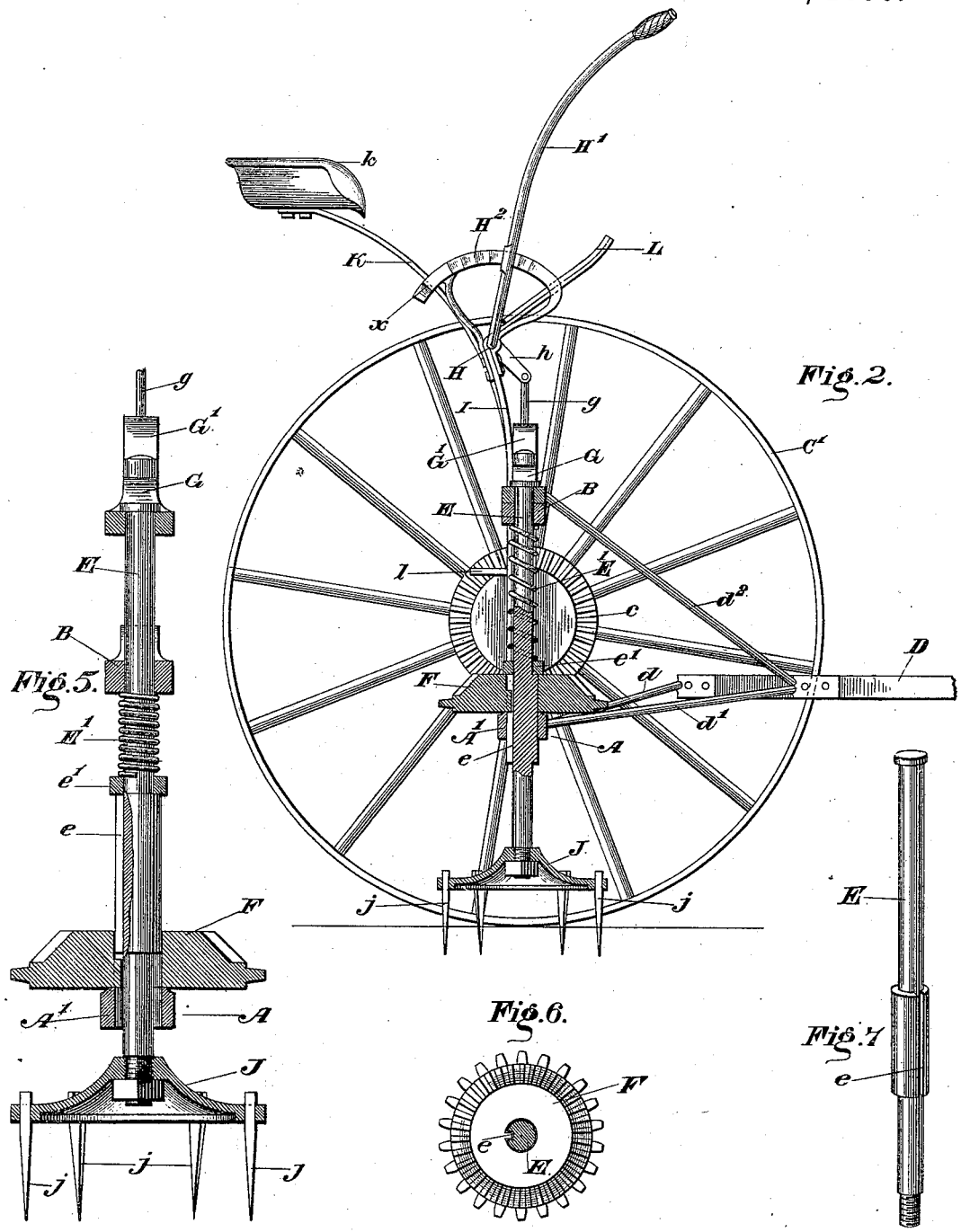

UNITED STATES PATENT OFFICE.

JOHN B. KELSEY, JAMES WALLACE, AND JOHN B. THOMPSON, OF LEBANON, OREGON.

ROTARY WHEELED HARROW.

SPECIFICATION forming part of Letters Patent No. 510,143, dated December 5, 1893.

Application filed April 8, 1893. Serial No. 469,577. (No model.)

*To all whom it may concern:*

Be it known that we, JOHN B. KELSEY, JAMES WALLACE, and JOHN B. THOMPSON, all of Lebanon, in the county of Linn and State of Oregon, have invented certain new and useful Improvements in Rotary Wheeled Harrows; and we do hereby declare that the following is a full, clear, and exact description thereof, reference being had to the accompanying drawings, and to the letters of reference marked thereon, which form part of this specification.

This invention is an improvement in rotary wheeled harrows, and it consists in the novel construction and combinations of parts thereof as will be hereinafter described in detail and summarized in the claims.

In the drawings:—Figure 1 is a perspective rear view of the complete harrow. Fig. 2 is a detail sectional view of the same on line 2—2 Fig. 1. Fig. 3 is a detail view of one of the harrow disks. Fig. 4 is a detail view of the adjusting lever. Figs. 5, 6, and 7 are details.

The main frame of the harrow is formed of two members A, B, both preferably made of steel cast or stamped into the required shape, or of other suitable material, as cast malleable iron. The lower member A has a main horizontal portion A' through which are formed equidistant vertical openings or bearings for the passage of vertical shafts which carry the harrow disks. The ends of portion A' are upturned as at $A^2$, and then again bent horizontally outward, and longitudinally channeled to form the lower half $A^3$ of the axle journal boxes as shown. The upper part B is substantially similar in form to part A having vertical openings for the passage of the harrow disk carrying shafts opposite the openings in part A, and also having half journal boxes for the reception and retention of stub shafts C on the outer ends of which the carrying and driving wheels C' of the harrow frame are secured, and on their inner ends are bevel gears $c$. Part B is arched as at $B^2$ over the gears $c$ as shown in the drawings. The half boxes $A^3$, B' are rigidly united by tie bolts passing through perforated ears thereon as indicated at $b, b$, Fig. 1. The main portions of parts A, B, are therefore separated but parallel. The shaft D is connected to member A by suitable brace straps $d, d'$ as shown, and to part B also as by bifurcations $d^2$ of straps $d'$ so that the frame may be drawn forward.

E, E, designate the harrow disk carrying shafts which are journaled in the vertically opposed openings in parts A B, and are free to rotate and move longitudinally (vertically) therein. As shown there are four shafts E arranged parallel and equidistant. Upon the outermost shafts E are splined bevel gears F which mesh with the gears $c$ on the wheel shafts and upon the intermediate shafts E are sprocket wheels $f$. Gears F are also provided with sprocket teeth on their peripheries and they transmit motion to adjoining gears $f$ by sprocket chains $f'$ as indicated in the drawings. These sprocket and gear wheels are provided with keys fitted into longitudinal slots $e$ in the shafts by which the shafts are caused to revolve with the wheels but can move vertically, independently thereof. The shafts E may be somewhat enlarged at the portion wherein slots $e$ are made and these slots should not extend to the lower end of the shafts, but terminate such a distance above that when the shafts are raised, to their limit of upward movement, they will be disengaged from the sprockets and not rotated so that the machine can be driven from place to place without the harrows operating.

The sprockets and gears $f$, F, rest upon the top of member A, and collars $e'$ are secured to shafts E above the sprockets and gears, and coiled springs E' are placed on the shafts E intermediate collars $e'$ and member B by which means the shafts E are normally depressed yet can yield and rise independently to accommodate inequalities of surface over which the harrow disks pass.

The upper ends of shafts E pass through suitable openings in a lifting bar G (overlying the top of part B) and are headed on their extremities or otherwise loosely secured to the bar, so that when the bar rises they will be lifted thereby.

Bar G is raised by means of a link rod $g$ connected to the center of bar and to a crank arm $h$ on a rock shaft H journaled about centrally above part B in bracket arms I, I, bolted to part B as shown. The rock shaft can be turned by means of a hand lever H' on its end, and said lever locked when shifted by engaging a sector $H^2$ attached to the brackets as shown. A bowed truss rod G' is centrally connected to link $g$, and at its extremities to the opposite ends of bars G, so that the bar will be kept from bending when raised.

On the lower end of each shaft E is secured a disk J in any suitable manner, said disks being preferably conical, and connected to shaft E at center so that the securing devices are concealed and protected within the hollow or concave side of the disk. The peripheries of the disks are flattened and have vertical harrow teeth $j$ secured to them, each disk carrying a series of teeth. The disks are of such diameter that the peripheries of adjoining disks run close together, and thus their teeth are adapted to work the entire surface of the ground between the outermost teeth of the outermost disks.

The driver's seat $k$ is mounted on a standard K bolted to part B and to a depension on part B about centrally thereof, and a foot rest L is secured on the upper ends of bracket arms I as shown. A step $l$ may be attached to part B in position to enable the driver to readily mount to the seat.

When lever H' is drawn back into engagement with notch $x$ of the segment $H^2$, bar G is raised and shafts E drawn up until their slots disengage the keys of the sprockets F' $f$, and in this condition the machine can be readily hauled wherever desired. When the machine is in position for use, the bar G is lowered and the shafts are then caused to revolve when the machine is drawn forward, thereby rotating disks J rapidly and causing the harrow teeth thereon to break and harrow the ground in an effective manner. Each shaft being capable of an independent vertical movement, the harrow disks are allowed to accommodate themselves to inequalities of surface between the main wheels and thus thoroughly harrow the entire surface.

Having thus described our invention, what we claim as new, and desire to secure by Letters Patent thereon, is—

1. The combination of the main frame formed of an upper and lower member, the stub shafts journaled in the ends of said frame, the carrying wheels fixed to the outer ends of said shafts, and the bevel gears on the inner ends thereof; with the series of vertical shafts journaled in said members and vertically movable therein, the gearing for transmitting motion from the said bevel gears to the adjoining vertical shafts; the harrow teeth secured to the lower ends of said shafts, and the lifting bar loosely connected to the upper ends of the several shafts, and mechanism for raising said bar whereby the harrow teeth are elevated and the shafts can be lifted so as to disengage them from the driving gears, substantially as described.

2. A frame for rotary harrows consisting of the upper and lower parts B, A, having vertical openings for the passage of the harrow disk carrying shafts, and half boxes on their ends adapted to form the journal boxes for the main shafts when the parts are united, substantially as and for the purpose described.

3. The combination of the main frame, the series of vertical shafts, the gearing for driving said shafts, the springs for independently depressing said shafts, and the common lifting bar for simultaneously raising said shafts so as to disengage them from their driving gears, substantially as set forth.

4. The combination with the main frame, the series of vertical shafts journaled therein carrying harrow disks on their lower ends, the lifting bar connected to the upper ends of each of said shafts, and the link, crank arm, rock shaft, lever and sector whereby said bar can be adjusted and locked, substantially as and for the purpose specified.

5. The combination of the main frame composed of the parts A, B, the vertical harrow disk carrying shafts journaled therein, the horizontal stub shafts journaled in boxes formed by the meeting ends of said parts, the wheels rigidly secured to the outer ends of said shafts, and the gearing whereby said shafts operate the adjoining harrow carrying shafts, substantially as specified.

6. The combination with the rotatable and vertically adjustable spring controlled shaft, of the conical harrow disk secured to the lower end thereof, having a flattened rim and vertical harrow teeth attached to the rim, substantially as and for the purpose set forth.

7. The combination of the main frame, the stub shafts journaled in the ends thereof having carrying wheels on their outer ends, and the bevel gears on their inner ends, with the series of vertical independently spring controlled shafts journaled in said frame, and rotatable and vertically movable therein; the gearing for transmitting motion to said shafts, the harrow teeth on the lower ends thereof, the single common lifting bar loosely connected to the upper ends of said shafts, and the link, rock shaft, lever and sector for adjusting said bar, all substantially as herein set forth.

In testimony that we claim the foregoing as our own we affix our signatures in presence of two witnesses.

JOHN B. KELSEY.
    JAMES WALLACE.
    JOHN B. THOMPSON.

Witnesses:
 N. M. NEWPORT,
 BAKER NEWMAN.